United States Patent
Mizuno et al.

(10) Patent No.: US 7,350,052 B2
(45) Date of Patent: Mar. 25, 2008

(54) NETWORK SYSTEM AND METHOD FOR SETTING VOLUME GROUP IN THE NETWORK SYSTEM

(75) Inventors: Jun Mizuno, Yokohama (JP); Takeshi Ishizaki, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 11/180,535

(22) Filed: Jul. 14, 2005

(65) Prior Publication Data
US 2006/0190698 A1 Aug. 24, 2006

(30) Foreign Application Priority Data
Feb. 23, 2005 (JP) ............................. 2005-046423

(51) Int. Cl.
*G06F 12/10* (2006.01)
(52) U.S. Cl. .................... 711/203; 711/209; 711/221
(58) Field of Classification Search ................ 711/202, 711/203, 209, 221; 710/8, 9
See application file for complete search history.

(56) References Cited

U.S. PATENT DOCUMENTS

| | | | |
|---|---|---|---|
| 7,143,262 B2* | 11/2006 | Serizawa | ............ 711/171 |
| 7,206,860 B2* | 4/2007 | Murakami et al. | ........... 709/238 |
| 2004/0260861 A1* | 12/2004 | Serizawa et al. | ............... 711/4 |
| 2005/0120172 A1* | 6/2005 | Ozaki et al. | ................. 711/114 |
| 2006/0195676 A1* | 8/2006 | Honda et al. | ................ 711/202 |

FOREIGN PATENT DOCUMENTS

JP 2004-178253 6/2004

* cited by examiner

*Primary Examiner*—Jack Lane
(74) *Attorney, Agent, or Firm*—Antonelli, Terry, Stout & Kraus, LLP.

(57) ABSTRACT

Disclosed is a method for setting virtual volume groups in a storage network system. The system includes a lower storage apparatus, host computers, an upper storage apparatus, and an administrative server. The method for setting virtual volume groups, executed by the administrative server, includes the steps of acquiring information on the real volumes, and port information on the physical devices in which the real volumes reside, creating virtual volumes being linked to the real volumes, based on the information on the real volumes, forming one or more virtual volume groups by combining the virtual volumes, based on the port information, in such a way that a relation between the virtual volumes and the virtual volume group are identical to a relation between the real volumes and the physical devices, and establishing the created virtual volume groups in the upper storage apparatus.

9 Claims, 15 Drawing Sheets

FIG.5

32 INTERMEDIATE SETTING FILE

| UPPER STORAGE APPARATUS INFORMATION | | | INTERMEDIATE VOLUME INFORMATION | |
|---|---|---|---|---|
| UPPER STORAGE APPARATUS ID | VIRTUAL VOLUME ID | INTERMEDIATE PORT ID | PORT ADDRESS | INTERMEDIATE VOLUME ID |
| STORAGE 1 | LU1 | A-1 | WWN10 | 1 |
| STORAGE 1 | LU2 | A-1 | WWN10 | 2 |
| STORAGE 1 | LU3 | A-1 | WWN10 | 3 |
| ... | ... | ... | ... | ... |

FIG.6

34 INTERMEDIATE INFORMATION DB

UPPER STORAGE APPARATUS INFORMATION

| UPPER STORAGE APPARATUS ID | VIRTUAL VOLUME ID | INTERMEDIATE PORT ID | VIRTUAL VOLUME GROUP ID |
|---|---|---|---|
| STORAGE 1 | LU1 | A-1 | #AG5-1 |
| STORAGE 1 | LU2 | A-1 | #AG5-1 |
| STORAGE 1 | LU3 | A-1 | #AG5-2 |
| ... | ... | ... | ... |

INTERMEDIATE VOLUME INFORMATION

| STORAGE APPARATUS ID | PORT ADDRESS | INTERMEDIATE VOLUME ID | VOLUME ID | RAID LEVEL | DISK TYPE | ARRAY GROUP |
|---|---|---|---|---|---|---|
| STORAGE 2 | WWN2 | 1 | LU1 | RAID5 | FC | AG-1 |
| STORAGE 2 | WWN2 | 2 | LU2 | RAID5 | FC | AG-1 |
| STORAGE 2 | WWN2 | 3 | LU3 | RAID1 | SATA | AG-2 |
| ... | ... | ... | ... | ... | ... | ... |

FIG.8A

38 STORAGE APPARATUS DB

| STORAGE APPARATUS ID | PORT ADDRESS |
|---|---|
| STORAGE 1 | WWN1,WWN2,WWN3,WWN4 |
| STORAGE 2 | WWN10 |
| ... | ... |

FIG.8B

38 STORAGE UNIT DB

| STORAGE APPARATUS ID | PORT NUMBER | PORT ADDRESS | INTERMEDIATE VOLUME ID | VOLUME ID | RAID LEVEL | DISK TYPE | ARRAY GROUP |
|---|---|---|---|---|---|---|---|
| STORAGE 1 | B-1 | WWN1 | 4 | LU4 | RAID5 | FC | AG-1 |
| STORAGE 1 | B-1 | WWN1 | 5 | LU5 | RAID5 | FC | AG-1 |
| STORAGE 2 | A-1 | WWN10 | 1 | LU1 | RAID5 | FC | AG-1 |
| STORAGE 2 | A-1 | WWN10 | 2 | LU2 | RAID5 | FC | AG-1 |
| STORAGE 2 | A-1 | WWN10 | 3 | LU3 | RAID1 | SATA | AG-2 |
| ... | ... | ... | ... | ... | ... | ... | ... |

FIG.10A

46 VOLUME GROUP DB (LOWER STORAGE UNIT SIDE)

| VOLUME ID | RAID LEVEL | DISK TYPE | ARRAY GROUP |
|---|---|---|---|
| LU1 | RAID5 | FC | AG1-1 |
| LU2 | RAID5 | FC | AG1-1 |
| LU3 | RAID1 | SATA | AG1-2 |
| ... | ... | ... | ... |

FIG.10B

46 VOLUME GROUP DB (UPPER STORAGE UNIT SIDE)

| VOLUME ID | RAID LEVEL | DISK TYPE | VOLUME GROUP | VIRTUAL VOLUME FLAG | INTERMEDIATE PORT | PORT ADDRESS | INTERMEDIATE VOLUME ID |
|---|---|---|---|---|---|---|---|
| LU4 | RAID5 | FC | AG1-1 | 0 | | | |
| LU5 | RAID5 | FC | AG1-1 | 0 | | | |
| LU1 | RAID5 | FC | #AG5-1 | 1 | A-1 | WWN10 | 1 |
| LU2 | RAID5 | FC | #AG5-1 | 1 | A-1 | WWN10 | 2 |
| LU3 | RAID1 | SATA | #AG5-2 | 1 | A-1 | WWN10 | 3 |
| ... | ... | ... | ... | ... | ... | ... | ... |

NETWORK SYSTEM AND METHOD FOR SETTING VOLUME GROUP IN THE NETWORK SYSTEM

CROSS-REFERENCE TO RELATED APPLICATIONS

This application claims the benefit of Japanese Patent Application 2005-046423 filed on Feb. 23, 2005, the disclosure of which is incorporated herein by reference.

BACKGROUND

The present invention relates to a method for setting one or more virtual volume groups in a storage network system.

A technique of virtual hardware has advanced. This technique allows a user to use hardware that is not actually present in an apparatus as if this hardware were present in the apparatus.

It is assumed that a first apparatus has a virtual device and a second apparatus has a physically existing device (thereinafter, called "physical device"). To apply the virtual technique to these apparatuses, a link is typically established therebetween, so that a user can access the physical device through the virtual device. Once receiving a request for using the virtual device from a user through a user terminal, the first apparatus enables the user to utilize the physical device via the link. In this case, the first apparatus serves as an intermediate between the user terminal and the second apparatus.

Referring to FIG. 15A, a storage apparatus R1 uses physical volumes of a storage apparatus R2 as virtual volumes. The storage apparatus R2 has three physical (or real) volumes (LUs 5, 6 and 7). The storage apparatus R1 uses two of them (LUs 5 and 6) as virtual volumes, and enables a user to use the storage apparatus R2 as if the virtual volumes were stored in the storage apparatus R1. The storage apparatus R1 integrates the virtual volumes into a single volume group AG 1. Note that this volume group is constituted by a bundle of virtual volumes integrated in accordance with conditions of a computer.

When the virtual volume group is created, the virtual volumes are not always integrated into a large single volume group, but the size of the virtual volume group can be determined flexibly depending on an application. To give an example, Japanese Unexamined Patent Application Publication 2004-178253 discloses a method for integrating the volumes, depending on disk specifications such as the type of a disk or the level of Redundant Arrays of Inexpensive Disks (RAID), when virtual volumes are created.

However, in conventional techniques, physical and virtual volumes are not distinguished from each other. This may be advantageous for some applications, but in general, the distinction is essential to make full use of hardware characteristics, such as achieving load distribution.

Referring to FIG. 15B, four virtual volumes (LUs 5, 6, 7 and 8) are allocated to two physical disks in the storage apparatus R2. The storage apparatus R1 integrates virtual volumes into the two volume groups (AGs 3 and 4).

The real volumes to be linked by the virtual volumes (LUs 5 and 6) of the AG 3 are allocated to the single disk, whereas the real volumes corresponding to the virtual volumes (LUs 7 and 8) of the AG 4 are allocated to the different disks. Accordingly, it is assumed that two processes are assigned to the volume groups AGs 3 and 4, respectively. In this state, if the volume groups AGs 3 and 4 are used at the same time, then load distribution cannot be achieved. This is because the LUs 5, 6 and 7 are present in the single physical disk.

This disadvantage is due to the fact that the volume groups are not set based on the arrangement of the real volumes in each physical disk. As in the above conventional techniques, when the volume groups are set based on disk specifications such as the type of disk or the level of the RAID, information on physical disks cannot be obtained. Accordingly, when the volume groups are assigned to real volumes, the virtual volumes with a heavy load may be assigned to the real volumes in the single physical disk. Consequently, the access is prone to be concentrated on the single physical disk, thereby deteriorating the access capability of the system composed of the storage apparatuses.

SUMMARY

Taking the above disadvantage into account, the present invention has been conceived. An object of the present invention is to provide a storage system in which volume groups, each being composed of virtual volumes, are set appropriately in terms of load distribution. An additional object of the present invention is to provide a method for setting volume groups in the above storage system.

According to an aspect of the present invention, in a storage network system constituted of: at least one lower storage apparatus in which one or more physical devices, each of which has one or more real volumes, are arranged; one or more computers, each being capable of using data in the volumes, for providing data access to the corresponding real volumes; at least one upper storage apparatus for conducting mediation of the data access; and an administrative server for setting the mediation, a method for setting virtual volume groups through the storage network system, executed by the administrative server, the method including:

(a1) acquiring information on the real volumes, and port information on the physical devices in which the real volumes reside;

(b1) creating virtual volumes being linked to the real volumes, based on the information on the real volumes;

(c1) forming one or more virtual volume groups by combining the virtual volumes, based on the port information, in such a way that a relation between the virtual volumes and the virtual volume groups in which the virtual volumes reside are identical to a relation between the real volumes and the physical devices in which the real volumes reside; and (d1) establishing the created virtual volume groups in the upper storage apparatus.

According to another aspect of the present invention, a storage network system including:

(a2) at least one lower storage apparatus provided with one or more physical devices, each of which has one or more real volumes;

(b2) one or more computers each being capable of using data in the volumes and for providing data access to the corresponding real volumes;

(c2) at least one upper storage apparatus for conducting mediation of the data access; and (d2) an administrative server for setting the mediation, the administrative server comprising functions of:

(a3) acquiring information on the real volumes, and port information on the physical devices in which the real volumes reside;

(b3) creating one or more virtual volumes being linked to the real volumes, based on the information on the real volumes;

(c3) forming one or more virtual volume groups by combining the virtual volumes, based on the port information, in such a way that a relation between the virtual volumes and the virtual volume groups in which the virtual volumes reside are identical to a relation between the real volumes and the physical devices in which the real volumes reside; and (d3) establishing the created virtual volume groups in the upper storage apparatus.

Other objects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 5 is a view depicting a configuration of an intermediate setting file according to one embodiment of the present invention;

FIG. 6 is a view depicting a configuration of an intermediate information DB according to one embodiment of the present invention;

FIG. 8A is a view depicting a configuration of a storage apparatus DB according to one embodiment of the present invention;

FIG. 8B is a view depicting another configuration of the storage apparatus DB;

FIG. 10A is a view depicting a configuration of a volume group DB (lower storage apparatus side) according to one embodiment of the present invention;

FIG. 10B is a view depicting another configuration of the volume group DB (upper storage apparatus side);

DETAILED DESCRIPTION OF THE EXEMPLARY EMBODIMENTS OF THE INVENTION

A detail description will be given below, of a storage system and a method for setting volume groups in the storage system, according to first and second embodiments of the present invention.

Figure 1:
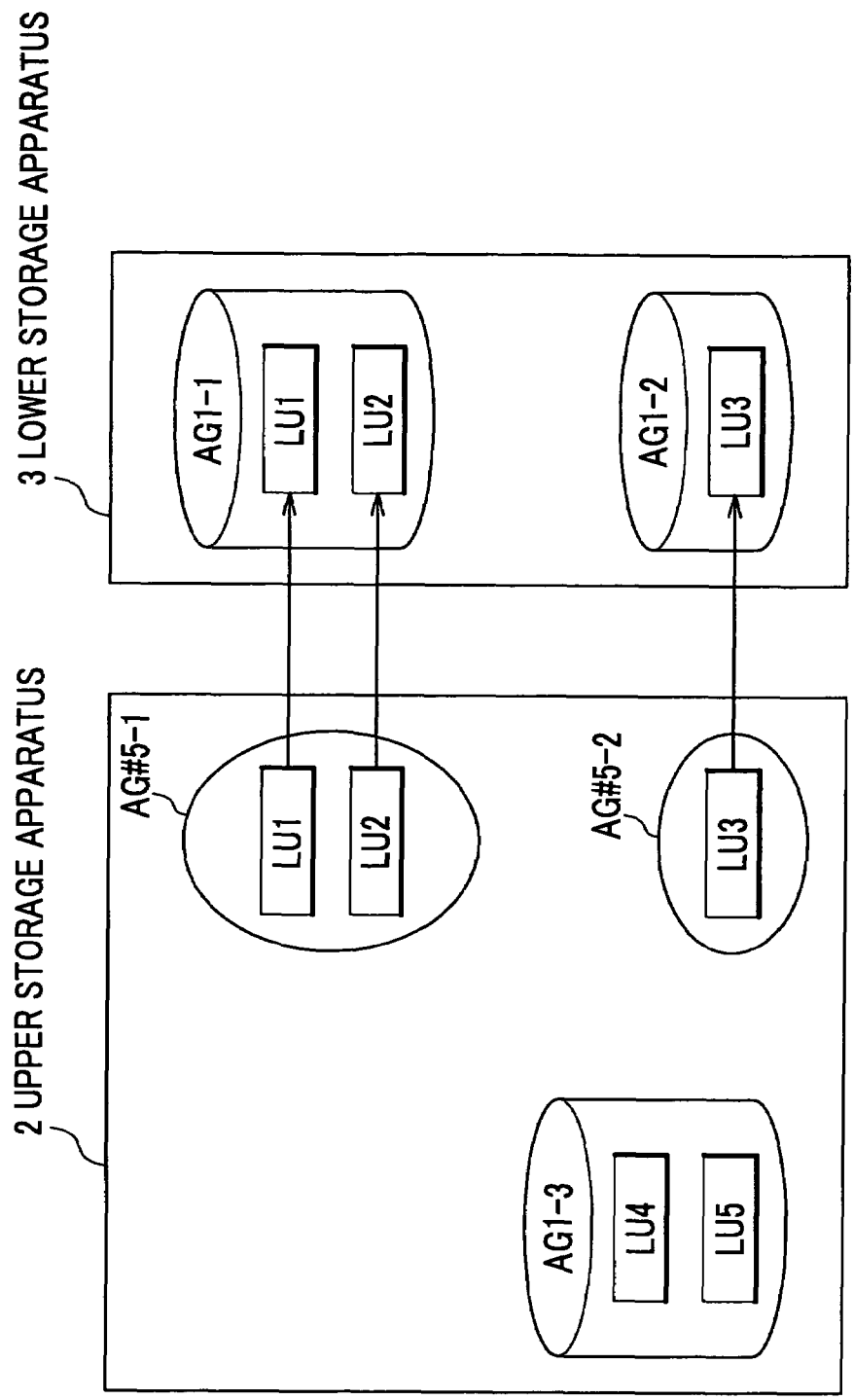
FIG. 1 is a view for explaining a configuration of volume groups according to one embodiment of the present invention.

Referring to FIG. 1, an upper storage apparatus 2 has virtual volumes corresponding to real volumes (LUs 1, 2 and 3) within physical devices (AG1-1 and AG1-2) in a lower storage apparatus 3. These virtual volumes are gathered to make up two virtual volume groups. Herein, a virtual volume group is denoted by a group which is composed of multiple virtual volumes, and which is created in accordance with a request from a computer. In this case, the upper storage apparatus 2 has the virtual volume groups AG#5-1 and AG#5-2, and their configuration is similar to that of the physical devices in the lower storage apparatus 3.

Because of the above configurations, the volume groups in the upper storage apparatus 2 are linked to the real volume groups in the lower storage apparatus 3 in a one-to-one relationship. This realizes load distribution, because the real volume groups within the single physical device in the lower storage apparatus 3 are never used at the same time, even if multiple virtual volume groups in the upper storage apparatus 2 are used simultaneously. Furthermore, the upper storage apparatus 2 has a physical device AG 1-3 which may be available to a user, in addition to the volume groups.

First Embodiment

Figure 2:
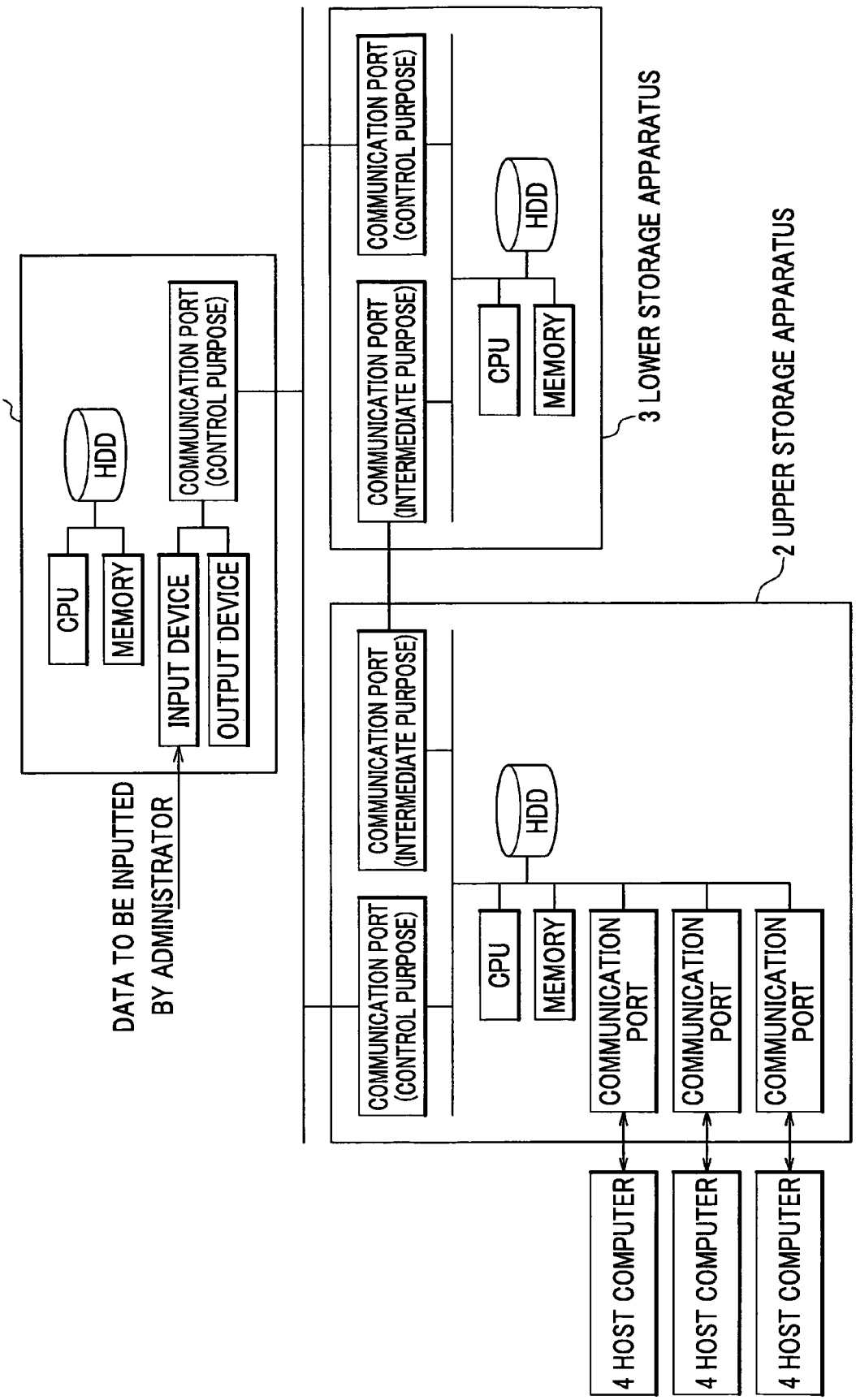
FIG. 2 is a block diagram depicting hardware of a storage network system according to one embodiment of the present invention.

Referring to FIG. 2, a storage network system according to a first embodiment of the present invention includes an administrative server 1, host computers 4, an upper storage apparatus 2 and a lower storage apparatus 3.

Each of the administrative server and the storage apparatuses 2 and 3 is composed of a memory for use in a computing process, a processor for performing the computing process, and other components. The memory may be a random access memory (RAM) The processor has a central processing unit (CPU), which executes a program recorded on the memory in order to carry out the computing process. The program and data handled by the program are stored in a storage section 30 (see FIG. 4). Each of the administrative server and the storage apparatuses 2 and 3 further includes an internal bus interconnecting its internal components. The storage section 30 may be a physical device selected from one of a hard disk drive (HDD), a magnetic disc, an optical disc, a magneto-optical disc, and a magnetic tape.

A detail description will be given below, of individual functions of the administrative server and the storage apparatuses 2 and 3. The lower storage apparatus 3 has real volumes to be made virtual. The upper storage apparatus 2 mediates between the real volumes of the lower storage apparatus 3 and the host computers 4, based on volume information acquired from the lower storage apparatus 3. The real volumes in the lower storage apparatus 3 are linked to virtual volumes of volume groups in the upper storage apparatus 2. Furthermore, a user accesses the virtual volume groups through each host computer 4. This host computer 4 can use data in the volumes in the upper and lower storage apparatuses 2 and 3. As a result, the user can access the real volumes of the lower storage apparatus 3 indirectly.

The administrative server 1 sets the upper storage apparatus 2 with reference to an intermediate setting file 32 (see FIG. 5) to which an administrator has inputted information. This enables the upper storage apparatus 2 to mediate between the host computers 4 and the lower storage apparatus 3. Furthermore, the administrative server 1 includes an input device, an output device and a communication port (administration purpose). The input device receives information to be inputted to the intermediate setting file 32. The output device applies the information from intermediate setting file 32 to the administrator. The communication port (administration purpose) serves as a network interface for notifying the intermediate setting to the upper storage apparatus 2.

In this system, all storage apparatuses can be classified into two types; one is the upper storage apparatus 2 and the other is the lower storage apparatus 3. Each host computer 4 is series-connected to the upper storage apparatus 2 and the lower storage apparatus 3 in this order. The mediation of the volumes is aimed at making a user feel as if the volumes of the lower storage apparatus 3 were those of the upper storage apparatus 2. Upon mediation, even if the upper storage apparatus 2 is a high-performance model but the lower storage apparatus 3 is a low-performance model, then the lower storage apparatus 3 can utilize the function and the powerful, high capacity cash of the upper storage apparatus 2. This results in the effective utilization of an old type or low-performance storage apparatus.

Continuing to FIG. 2, the upper storage apparatus 2 includes three types of communication ports. One type is connected to the host computer 4, and serves as an interface for communication with the host computer 4. Another type serves as an interface for communication with the lower storage apparatus 3. An additional type serves as an interface for communicating administrative data. Since being not connected to the host computers 4 directly, the lower storage apparatus 3 does not have any communication port for the host computer 4. Moreover, the upper storage apparatus 2 further includes physical disks, a memory, and a controller for managing an internal process.

The lower storage apparatus 3 has a configuration similar to that of the upper storage apparatus 2. However, lower storage apparatus 3 needs to have neither of the communication ports for the host computer, nor the function of possessing real volumes of other storage apparatuses as virtual volumes. Note that, when the real volumes of the lower storage apparatus 3 do not function as the virtual volumes of the upper storage apparatus 2, the real volumes does not have to be linked thereto.

Figure 3:
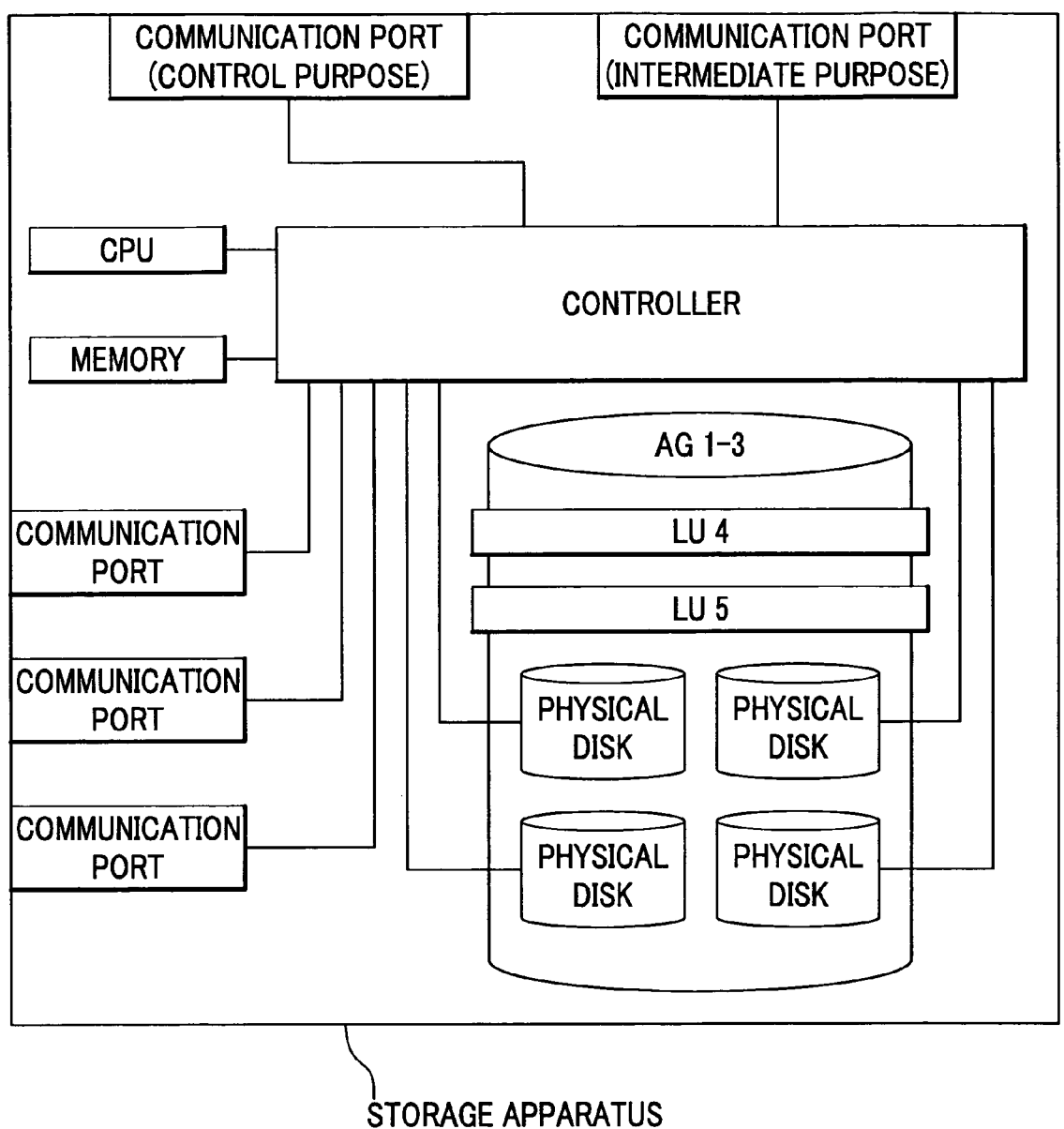
FIG. 3 is a view depicting a configuration of a typical storage apparatus.

FIG. 3 shows a structure of a typical storage apparatus. This storage apparatus may be applied to the upper and lower storage apparatuses 2 and 3. The storage apparatus can use multiple internal physical disks to realize a RAID system. In addition, the group of the physical disks that realize the RAID system is called "array group". In this figure, the four physical disks create an array group, and the two volumes LUs 1 and 2 are allocated to this array group.

Figure 4:
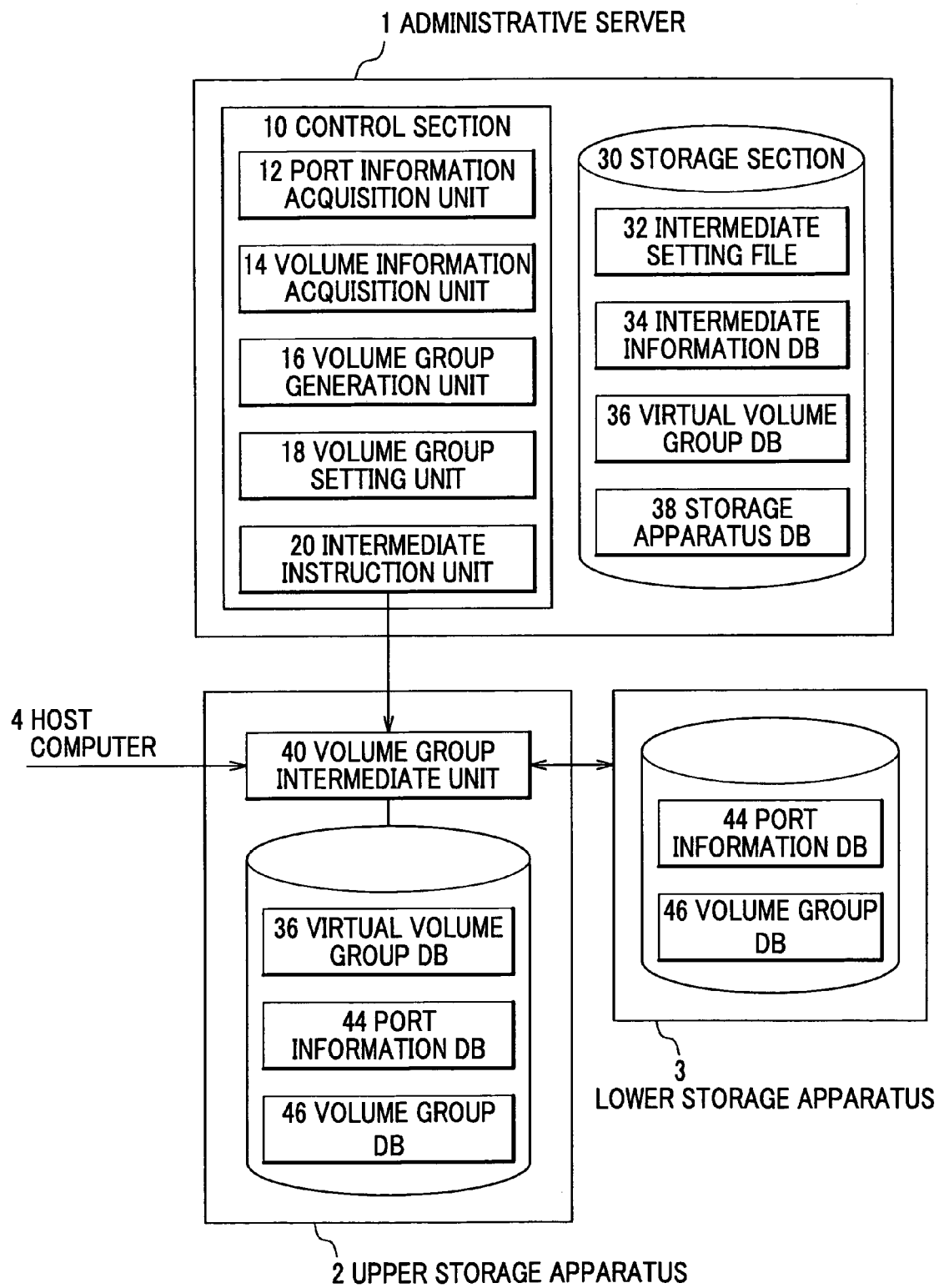
FIG. 4 is a detail block diagram depicting the storage administrative system.

Referring to FIG. 4, the administrative server 1 includes a control section 10 which executes a program, and the storage section 30 which stores the program and related data. The control section 10 is composed of a port information acquisition unit 12, a volume information acquisition unit 14, a volume group generation unit 16, a volume group setting unit 18 and an intermediate instruction unit 20. The storage section 30 is composed of the intermediate setting file 32, an intermediate information DB 34, a virtual volume group DB 36 and a storage apparatus DB 38.

The function of both the port information acquisition unit 12 and the volume information acquisition unit 14 is to collect information on the storage apparatuses. Specifically, the port information acquisition unit 12 collects port setting information on the upper and lower storage apparatuses 2 and 3. The volume information acquisition unit 14 acquires volume information on the lower storage apparatus 3.

The functions of the volume group generation unit 16, of the volume group setting unit 18, and of the intermediate instruction unit 20 are to make the upper storage apparatus 2 mediate between the host computer 4 and the lower storage apparatus 3, based on the information on the storage apparatuses. Specifically, the volume group generation unit 16 creates virtual array group(s) of the upper storage apparatus 2, based on array group(s) of the lower storage apparatus 3. The volume group setting unit 18 establishes the virtual array group(s) of the upper storage apparatus 2, based on the array group(s) of the lower storage apparatus 3. The intermediate instruction unit 20 directs the upper storage apparatus 2 to mediate through the array groups being established by the volume group setting unit 18.

Referring to FIG. 5, the intermediate setting file 32 contains information on the mediation of the volume groups, which has been inputted by the administrator. Alternatively, this mediation information may be created by the administrator through a graphical user interface (GUI).

The intermediate setting file 32 contains upper storage apparatus information and intermediate volume information. The upper storage apparatus information has an upper storage apparatus ID, a virtual volume ID, and an intermediate port ID. The intermediate volume information has a port address of the lower storage apparatus 3 and an intermediate volume ID. By coupling together the port address and the intermediate volume ID, the volumes of each storage apparatus connected to a network can be identified uniquely.

Referring to FIG. 6, the intermediate information DB 34 contains upper storage apparatus information and intermediate volume information. The upper storage apparatus information has an upper storage apparatus ID, a virtual volume ID, an intermediate port ID, and a virtual volume group ID.

The intermediate volume information has:

(a4) a storage apparatus ID, which indicates the ID of a storage apparatus having an intermediate volume;

(b4) a port address, which indicates the address of port of the lower storage apparatus 3 for connection with an intermediate volume;

(c4) an intermediate volume ID;

(d4) a volume ID;

(e4) a RAID level, which indicates the level of RAID system of each intermediate volume;

(f4) a disk type, which indicates the disk type of each intermediate volume; and (g4) an array group, which indicates the array group in which each intermediate volume resides.

Figure 7A:
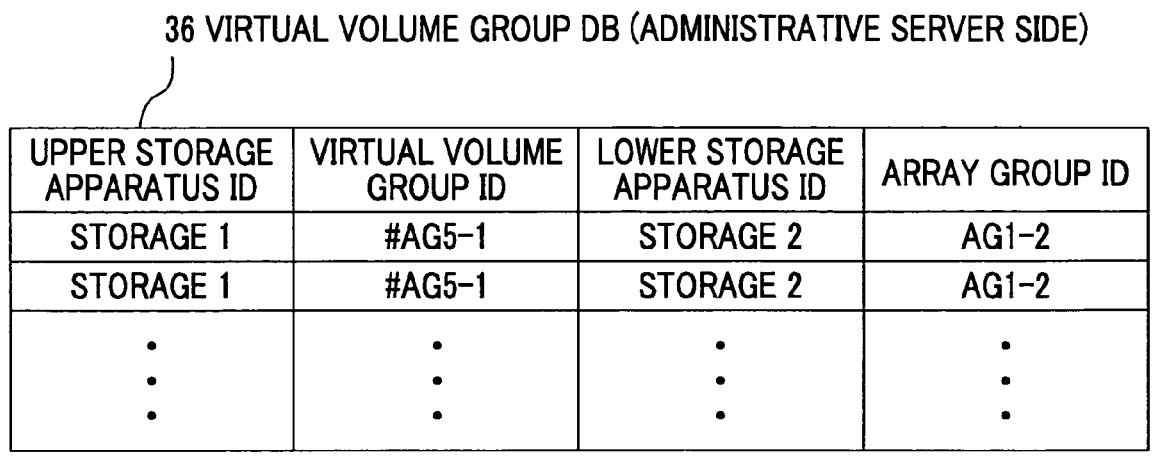
FIG. 7A is a view depicting a configuration of a virtual volume group DB (administrative server side) according to one embodiment of the present invention.

Referring to FIG. 7A, the virtual volume group DB 36 contains an upper storage apparatus ID that indicates the ID of the upper storage apparatus 2, a virtual volume group ID that indicates the ID of a virtual volume group in the upper storage apparatus 2, a lower storage apparatus ID that indicates the ID of the lower storage apparatus 3, and an array group ID that indicates the ID of each array group of the lower storage apparatus 3.

Referring to FIG. 8A, a storage apparatus DB 38 contains a storage apparatus ID, and a port address that indicates the address of each port of the storage apparatus.

Referring back to FIG. 4, the upper storage apparatus 2 includes a volume group intermediate unit 40, a virtual volume group DB 36, a port information DB 44 and a volume group DB 46. The lower storage apparatus 3 includes a port information DB 44 and a volume group DB 46.

Figure 7B:
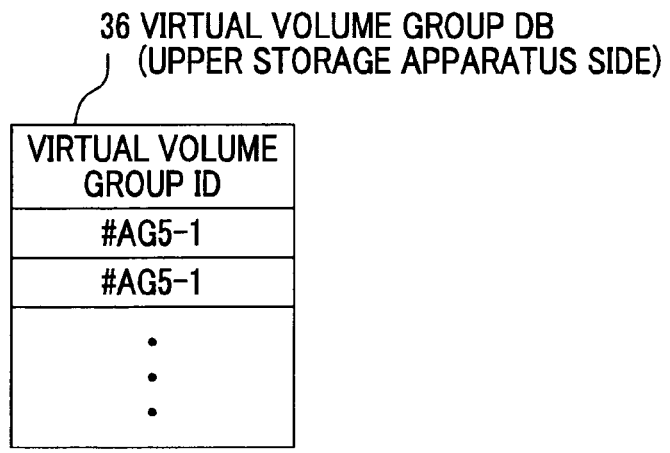
FIG. 7B is a view depicting a configuration of the virtual volume group DB (upper storage apparatus side)

Referring to FIG. 7B, the virtual volume group DB 36 contains a virtual volume group ID that indicates the ID of each virtual volume group of the upper storage apparatus 2.

Figure 9:
FIG. 9 is a view depicting a configuration of a port information DB according to one embodiment of the present invention.

Referring to FIG. 9, the port information DB 44, from which the port information acquisition unit 12 acquires port information, contains a port number, a port address, an intermediate volume ID, and a volume ID.

Referring to FIG. 10A, the volume group DB 46 of the lower storage apparatus 3 applies volume information to the volume information acquisition unit 14 in response a request therefrom. The volume group DB 46 contains a volume ID, a RAID level, a disk type, and an array group.

Referring to FIG. 10B, the volume group DB 46 contains information on the virtual group being linked to the real volume of the lower storage apparatus 3, in addition to information on real volumes in the lower storage apparatus 3 as shown in FIG. 10A.

Concretely, the volume group DB 46 of the upper storage apparatus contains:

(a6) a volume ID;
(b6) a RAID level, which indicates the level of RAID system of each array group;
(c6) a disk type, which indicates the disk type of each array group;
(d6) a volume group, which indicates an volume group in which each volume resides;
(e6) a virtual volume flag, which indicates whether volumes are virtual or not;
(f6) an intermediate port for use in connection with the intermediate volumes;
(g6) a port address of the lower storage apparatus 3 for connection with intermediate volumes; and
(h6) an intermediate volume ID.

The volume group DB 46 (see FIGS. 10A and 10B) contains information on the relation between volumes and volume groups in which the volumes reside. By referring to this information, all volumes in the volume group can be identified.

Figure 11:
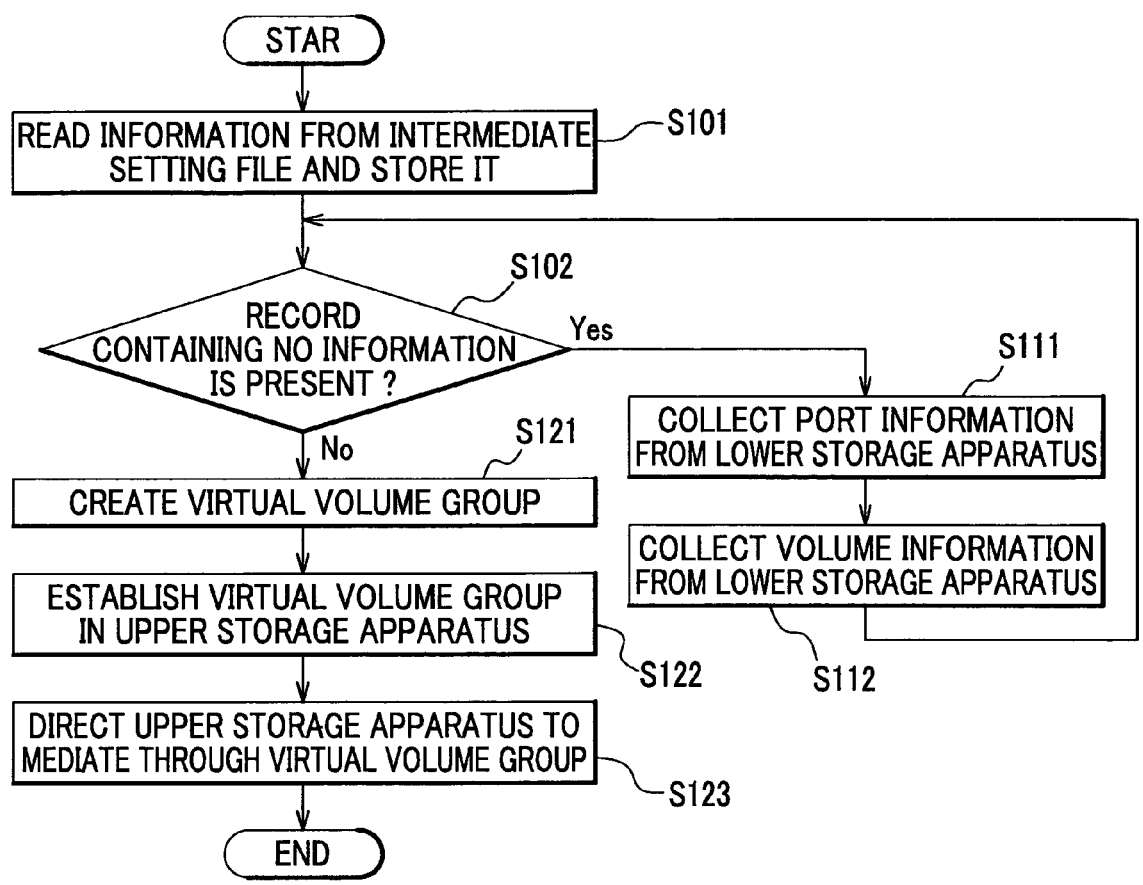
FIG. 11 is a flowchart showing a main routine of a method for setting volume groups according to a first embodiment of the present invention.

FIG. 11 shows a routine executed when an administrator sets the virtual volume group, with reference to the intermediate setting file 32. By executing this routine, the upper storage apparatus 2 can have the volume groups equivalent to the physical disks of the lower storage apparatus 3. Moreover, the administrator can assign the virtual groups of the upper storage apparatus 2 to the host computers 4, based on the arrangement of the physical devices.

First, the control section 10 reads the information from the intermediate setting file 32 and, then stores it in the intermediate information DB 34 (S101).

Second, the port information acquisition unit 12 of the control section 10 collects port information from each record of the intermediate information DB 34. In addition, the volume information acquisition unit 14 collects volume information from each record of the intermediate information DB 34. The control section 10 searches the intermediate information DB 34 for any record containing no information (port and volume information) (S102).

If any record containing no information is found ("YES" in S102), then port information acquisition unit 12 collects port information from the lower storage apparatus 3 (S111). Subsequently, the volume information acquisition unit 14 collects volume information from the lower storage apparatus 3 (S112), and the control section 10 then allows processing to return to S102.

Otherwise ("NO" in S102), the volume group generation unit 16 creates virtual volume groups (S121). Subsequently, the control section 10 establishes the volume groups (S122) and, then directs the upper storage apparatus 2 to mediate through the volume groups (S123).

Figure 12A:
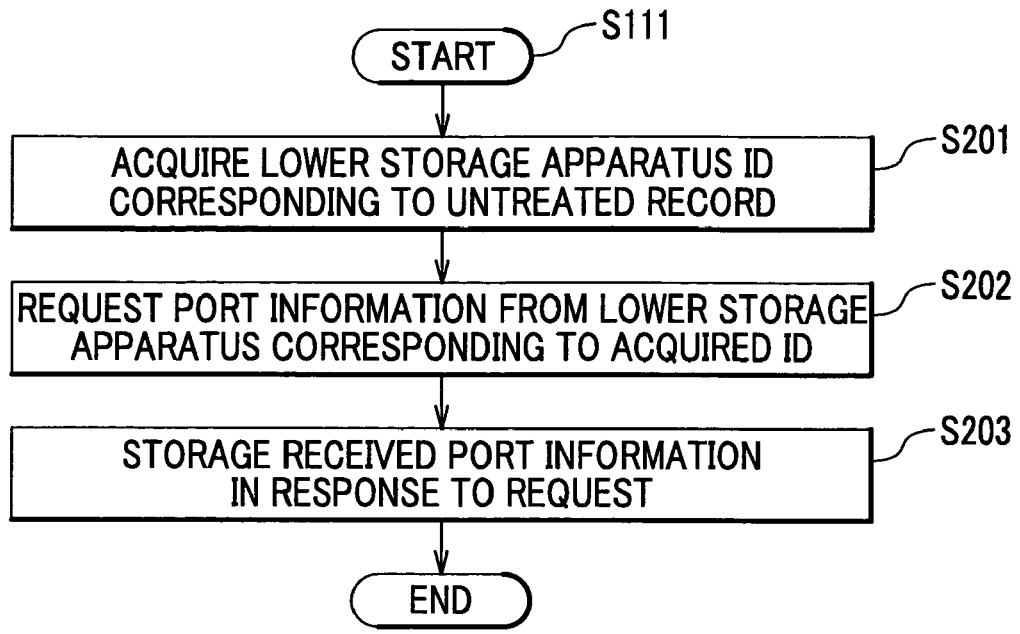
FIG. 12A is a flowchart showing a routine in which a storage apparatus collects information, according to the first embodiment.

FIG. 12A shows a routine in which the port information acquisition unit 12 collects the port information (S111). This routine will be described below.

First, the port information acquisition unit 12 extracts a port address from a first record out of the records containing no port information in the intermediate information DB 34. Subsequently, the port information acquisition unit 12 searches the storage apparatus DB 38 for the ID of the lower storage apparatus which has a port address identical to the extracted port address (S201). The found ID represents the ID of the lower storage apparatus 3.

The port information acquisition unit 12 sends a request for port information to the lower storage apparatus 3 having an ID identical to the found ID (S202). This request contains the ID of the sending source and the extracted port address.

Once receiving this request, the lower storage apparatus 3 searches the port information DB 44 for information on a port that has a port address identical to that contained in the received request. The lower storage apparatus 3 then sends back the found information to the port information acquisition unit 12.

Upon reception of the port information from the lower storage apparatus 3, the port information acquisition unit 12 extracts a volume ID from the received port information. Subsequently, the port information acquisition unit 12 stores the extracted volume ID as a volume ID of the intermediate volume information on the first record having no port information in the intermediate information DB 34 (S203).

Figure 12B:
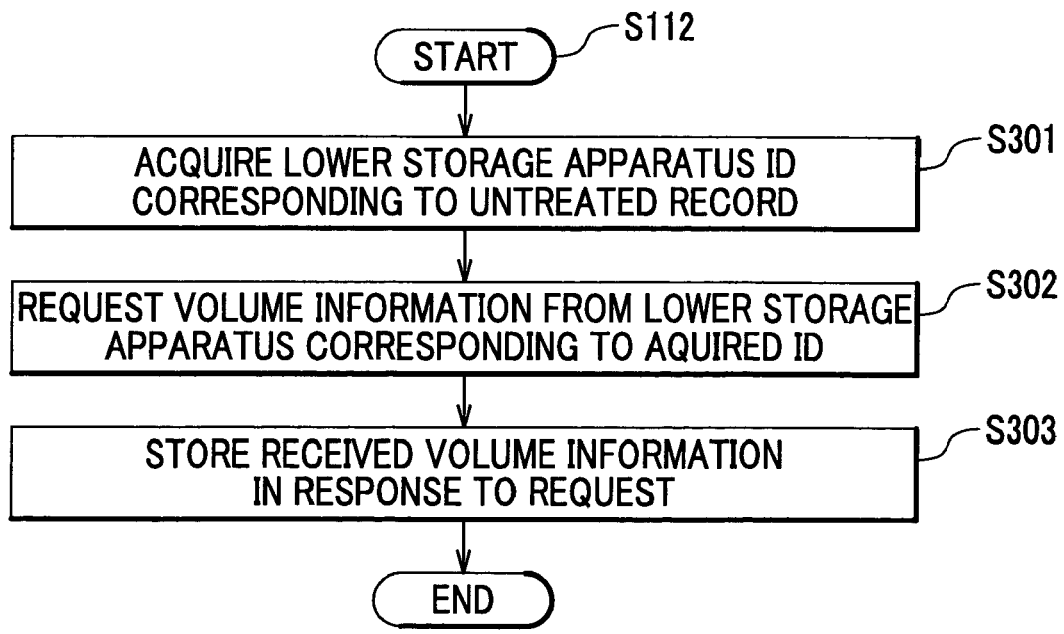
FIG. 12B is a flowchart showing another routine in which the storage apparatus collects information.

FIG. 12B shows a routine in which the volume information acquisition unit 14 collects the volume information (S112).

First, the volume information acquisition unit 14 extracts a port address from a first record out of the records containing no volume information in the intermediate information DB 34. Subsequently, the volume information acquisition unit 14 searches the storage apparatus DB 38 for the ID of the storage apparatus which has a port address identical to the extracted port address (S301). The found ID represents the ID of the lower storage apparatus 3.

Second, the volume information acquisition unit 14 sends a request for volume information to the lower storage apparatus 3 having an ID identical to the found ID (S302). The volume information contains the IDs of a sending source and of a volume.

Note that the ID of the sending source is that of the administrative server 1, and the ID of the volume is an identifier of the first record containing no volume information.

Once receiving this request, the lower storage apparatus 3 searches the volume group DB 46 for information on a volume corresponding to the identifier. The lower storage apparatus 3 then sends back the found information to the volume information acquisition unit 14.

The volume information acquisition unit 14 extracts the RAID level, disk type and volume group from the received volume information and, then stores them as the volume information on the first record containing no volume information in the intermediate information DB 34 (S303).

Figure 13:
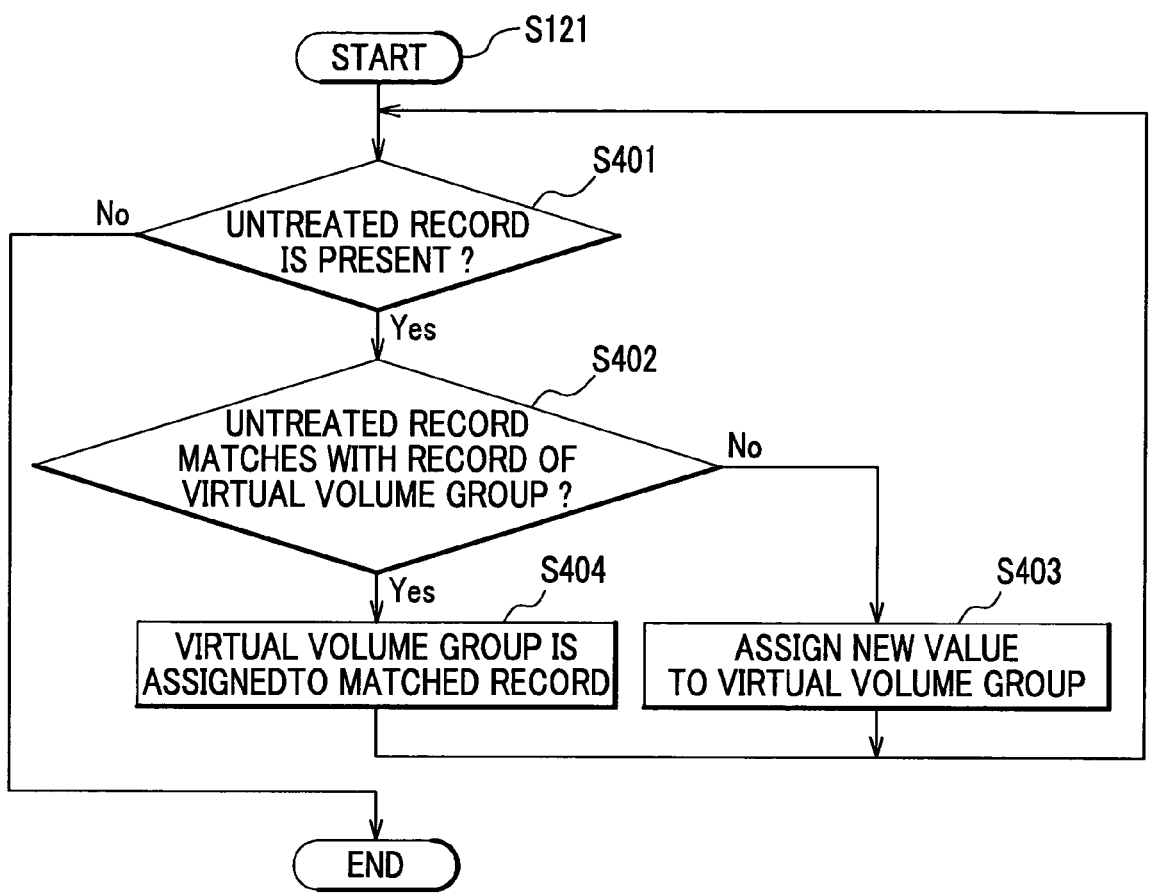
FIG. 13 is a flowchart showing a routine in which volume groups are created, according to the first embodiment.

FIG. 13 shows a routine in which volume groups are created (S121). This routine will be described below.

First, the volume group generation unit 16 searches the intermediate information DB 34 for an untreated record (S401). If any untreated record is found ("YES" in S401), then the volume group generation unit 16 executes the following routine for the found record.

The volume group generation unit 16 searches the virtual volume group DB 36 for a record having the IDs of the upper storage apparatus, of the lower storage apparatus and of the virtual volume group that are all identical to those in the virtual volume group DB 36, respectively.

If no records are found ("NO" in S402), then the ID of the virtual volume group of the first record in the intermediate information DB 36 is newly assigned (S403). This new ID needs to differ from all the existing virtual volume groups IDs in the virtual volume group DB 36. The new IDs may be incremented by 1 in order.

Otherwise ("YES" in S402), the virtual volume group of the corresponding record in the intermediate information DB 34 is assigned to that of the untreated record in the virtual volume group DB 36 (S404).

This routine returns to S401. If all the records in the intermediate information DB 34 undergoes the process already ("NO" in S401), then the volume group generation unit 16 terminates this routine. In this way, the volume group generation unit 16 executes the routine.

A concrete description will be given below, of a routine (S122) in which the volume group setting unit 18 sets the virtual volume groups.

Once receiving a request for setting of the virtual volume groups, the upper storage apparatus 2 updates its virtual volume group DB 36, allowing the virtual volume groups to be added or deleted. This request includes setting category designating the addition or delete of the virtual volume groups, and the information on the virtual volume groups such as ID.

The volume group setting unit 18 sends the request to the upper storage apparatus 2 for each record of the virtual volume group DB 36 of the administrative server 1. This request is created based on the information on the records of the virtual volume group DB 36. The volume group setting unit 18 establishes the IDs of all the virtual volume groups of the virtual volume group DB 36 in the upper storage apparatus 2.

Continuously, a detail description will be given below, of a routine (S123) in which the intermediate instruction unit 20 directs the upper storage apparatus to mediate through the volume groups.

The intermediate instruction unit 20 sends instructions for mediating through the volume groups to all the upper storage apparatuses 2 on which information has been assigned to the records of the intermediate information DB 34.

First, the intermediate instruction unit 20 sends an intermediate request to the upper storage apparatus 2 for each record of the intermediate information DB 34. This request is created based on the contents of records of the intermediate information DB 34.

This request includes: the ID of the virtual volume; the RAID level of the virtual volume; the disk type of the virtual volume; the volume group of the virtual volume; the intermediate port used for communication with the real volume; the port address used for communication with the real volume; and the ID of the real volume.

In the intermediate request, the intermediate instruction unit 20 designates the following items in the upper storage apparatus information of the intermediate volume information DB 34:
(a7) the volume ID;
(b7) the RAID level;
(c7) the type of the disk;
(d7) the virtual volume group;
(e7) the ID of the intermediate port;
(f7) the port address; and
(g7) the intermediate volume ID.

Once receiving the request from the intermediate instruction unit 20, the upper storage apparatus 2 updates the volume group DB 46, so that the intermediate process is ready.

As described above, the description has been given, of the storage network system and the method for setting volume groups through the storage network system, according to the first embodiment.

With this system and method, virtual volume groups composed of virtual volumes can be set appropriately in terms of load distribution.

Second Embodiment

Next, a detail description will be given below, of a storage network system and a method for setting volume groups through the storage network system, according to a second embodiment of the present invention. The second embodiment differs from the first embodiment as to timing of inputting information in the intermediate setting file 32. In the first embodiment, before the information on the storage apparatuses are collected (S111 and S112), the intermediate setting file 32 are read (S101), as shown in FIG. 10. In contrast, in the second embodiment, after the information on the storage apparatuses are collected (S105 and S106), the intermediate setting file 32 are read (S109), as shown in FIGS. 13A and 13B. This enables an administrator to create the intermediate setting file 32 with reference to the information on the storage apparatuses.

Since the second embodiment is similar to the first embodiment, the same reference numerals are given to the same parts as those already described in the first embodiment. Therefore, duplicate description is omitted, and only different points will be described. The concrete different points are a program stored in the hard disk, and information in the data base in the administrative server 1.

In this embodiment, the administrative server 1 acquires information, such as port or volume information, in response to the instruction of the administrator and, then outputs the acquired information to the administrator. Furthermore, the administrative server 1 reads information from the intermediate setting file 32, to which data has been inputted by the administrator, in response to the instruction of the administrator and, then directs the upper storage apparatus 2 to mediate through the volume groups.

In this embodiment, the virtual volume groups in the upper storage apparatus 2 can be created so as to have the arrangement equivalent to that of the physical devices of the lower storage apparatus 3. This enables the administrator to assign the virtual volume of the upper storage apparatus 2 to the host computer 4, based on the arrangement of the physical disks.

In FIG. 8B, the storage apparatus DB 38 stores the port information for each record. Concretely, the storage apparatus DB 38 contains a storage apparatus ID, a port number, a port address, an intermediate group ID, a volume ID, a RAID level, a disk type, and the volume group.

Figure 14A:
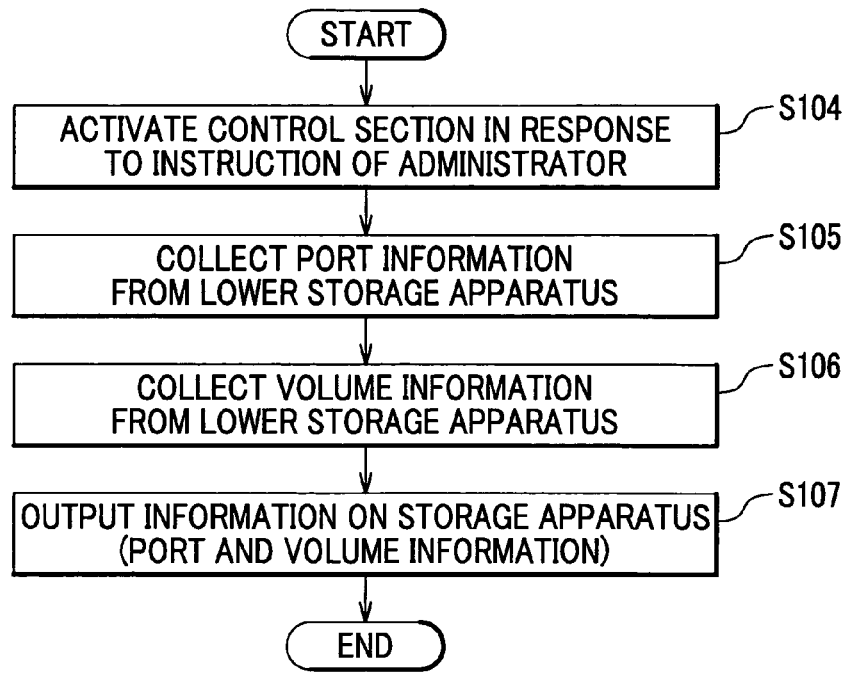
FIG. 14A is a flowchart showing a main routine of a method for setting volume groups according to a second embodiment of the present invention.
Figure 14B:
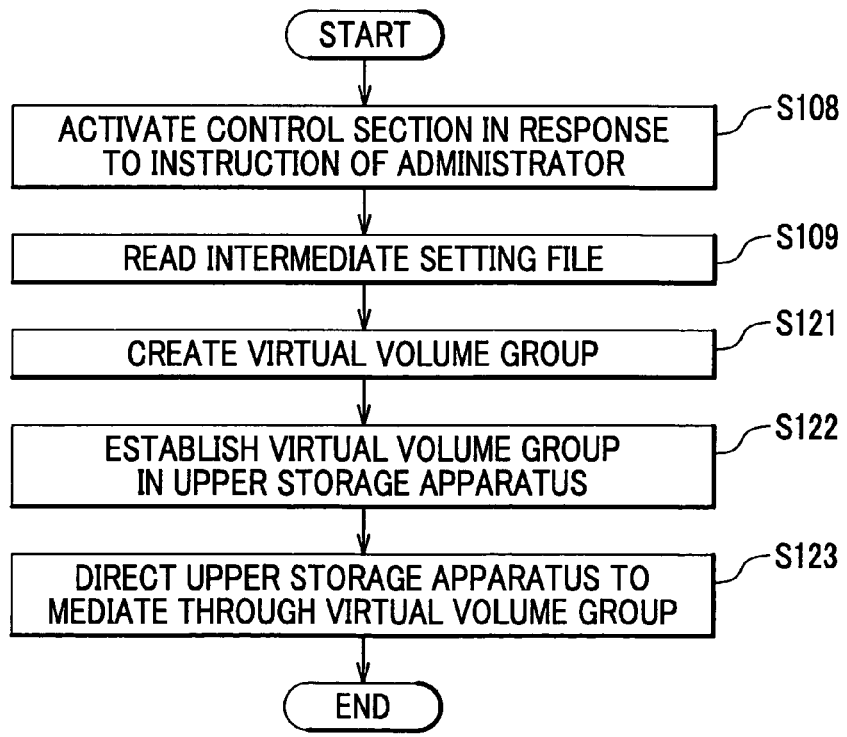
FIG. 14B is a flowchart showing another main routine of the method for setting volume groups.
Figure 15A:
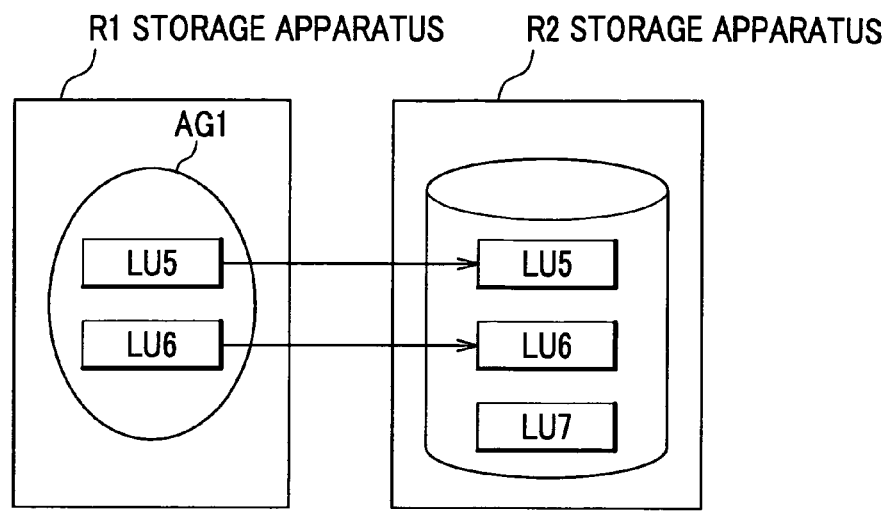
FIG. 15A is a view for explaining virtual volumes in storage apparatuses.
Figure 15B:
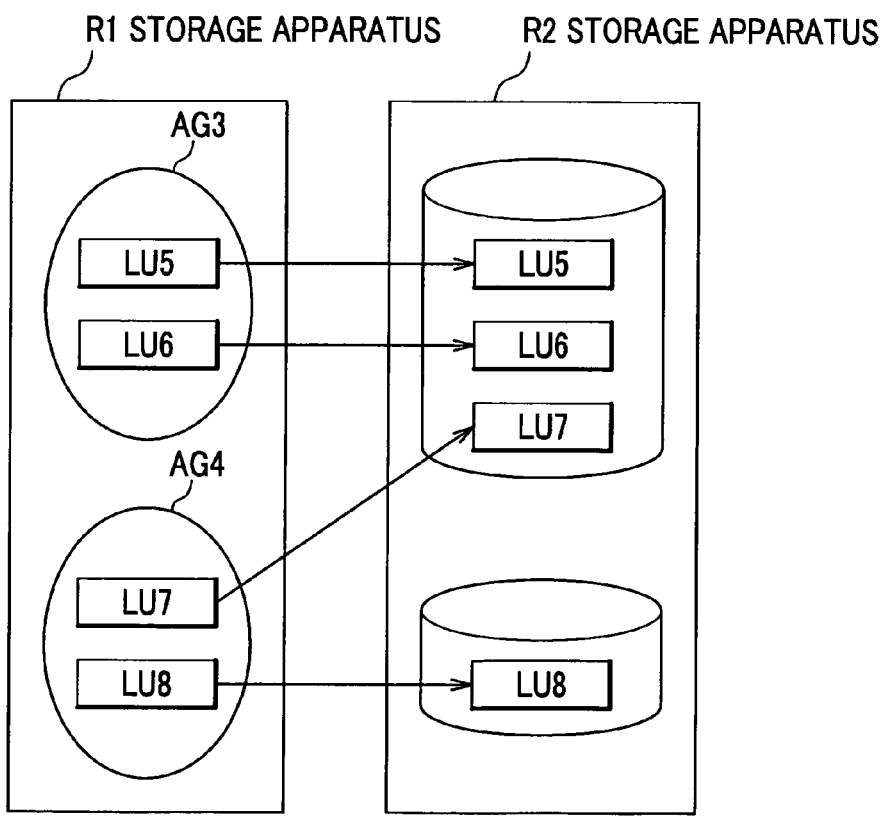
FIG. 15B is another view for explaining virtual volumes in storage apparatuses.

FIGS. 14A and 14B show main routines of the second embodiment.

A detail description will be given below, of the routines in which information on the storage apparatuses is collected.

First, an administrator executes a command to activate the control section 10 of the administrative server 1 (S104).

Second, the port information acquisition unit 12 of the control section 10 collects the port information from the lower storage apparatus 3 (S105). Specifically, the port information acquisition unit 12 refers to the storage apparatus ID of the storage apparatus DB 38 in the lower storage apparatus 3 and, then sends a request for the port information to all the lower storage apparatuses 3 registered in the storage apparatus DB 38.

Once receiving this request, each storage apparatus sends back the port information stored in the port information DB 44 to the administrative server 1. This port information contains the ID of the storage apparatus as a header, which indicates a sending source. The port information acquisition unit 12 receives the port information and, then sores it in the storage apparatus DB 38 for each record.

The stored port information contains the ID of the storage apparatus, a port number, a port address, the ID of an intermediate volume, and the ID of a volume.

Next, the volume information acquisition unit 14 of the control section 10 collects volume information from the storage apparatus (S106).

The volume information acquisition unit 14 refers to the storage apparatus ID stored in the storage apparatus DB 38. Subsequently, the volume information acquisition unit 14 sends a request for volume information to all the lower storage apparatuses 3 registered in the storage apparatus DB 38.

Once receiving the request, each storage apparatus 3 sends back the volume information, which is stored in the volume group ID in a form shown in FIG. 12, to the administrative server 1. The port information contains the ID of the lower storage apparatus 3 as a header, which indicates a sending source.

The volume information acquisition unit 14 searches the storage apparatus DB 38 for records having the storage apparatus IDs and the volume IDs identical to those of the received volume information.

A detail description will be given below, of a process in which the volume information acquisition unit 14 stores the volume information. The volume information acquisition unit 14 executes this routine every time acquiring the volume information.

The volume information acquisition unit 14 searches the storage apparatus DB 38 for the records having the sending source information and the ID of the volume identical to those of the received volume information. Further, the volume information acquisition unit 14 stores the RAID level, disk type and volume group that are all contained in the found records.

Finally, the control section 10 outputs the information stored in the storage apparatus DB 38 to the output device (S107)

With the above-described routines, the administrator is capable of acquiring the information on the storage apparatuses. Continuously, the administrator can create the intermediate setting file 32, based on the storage apparatus information. Furthermore, a routine in which the mediation is directed is executed based on the created intermediate setting file 32. This routine will be described with reference to FIG. 14B.

Referring to this figure, the administrator first executes a command to activate the control section 10 of the administrative server 1 (S108). Subsequent steps are shown as follows, although being identical to corresponding steps shown in FIG. 11.

The administrative server 1 reads the intermediate setting file 32 (S109). The volume group generation unit 16 creates the virtual volume groups (S121). The control section 10 establishes the virtual volume groups in the upper storage apparatus 2 (S122), and directs the upper storage apparatus 2 to mediate through the virtual volume groups (S123).

With the above system and method, the administrator can understand the conditions of the volume groups, thus enabling appropriate intermediate through the volume groups.

Up to this point, the first and second embodiments have been described. Note that the methods of the first and second embodiments may be implemented in a computer readable recording medium. In this case, the computer readable medium stores a program that executes these methods. Moreover, it is obvious that the present invention is not limited to these embodiments.

To give an example, although the administrative server 1 and the upper storage apparatus 2 are separated from each other in the above embodiments, they may be integrated. In this case, the upper storage apparatus 2 may be provided with a memory in which a program to be executed by the administrative server 1 is stored.

Furthermore, the two networks of FIG. 2 (administrative and communication purposes) may be integrated.

Moreover, in the embodiment, the number of the upper or lower storage apparatuses is one, as shown in FIG. 2, but the present invention is not limited thereto. Alternatively, the number of the storage apparatuses may be plural number.

In conclusion, the method of the above-described embodiment can achieve the creation of virtual volume groups in a storage system which are equivalent to physical disks of another storage system. Accordingly, an administrator can recognize the physical relation of the virtual volumes, thereby making it possible to set the virtual volume groups appropriately in terms of load distribution.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A storage network system including at least one lower storage apparatus in which one or more physical devices, each of which has one or more real volumes, are arranged, one or more computers, each being capable of using data in said volumes, for providing data access to the corresponding real volumes, at least one upper storage apparatus for conducting mediation of the data access, and an administrative server for setting the mediation, a method for setting virtual volume groups through the storage network system, executed by the administrative server, the method comprising:

acquiring information on the real volumes, and port information on the physical devices in which the real volumes reside;

creating virtual volumes being linked to the real volumes, based on the information on the real volumes;

forming one or more virtual volume groups by combining the virtual volumes, based on the port information, in such a way that the virtual volumes and the virtual volume groups in which the virtual volumes reside have a virtual-volume-to-virtual-volume-group configuration which is identical to a real-volume-to-physical-device configuration of the real volumes and the physical devices in which the real volumes reside; and establishing the created virtual volume groups in the upper storage apparatus.

2. The method according to claim 1,
wherein in acquiring the information, the information on the real volumes and the port information are outputted.

3. The method according to claim 1,
wherein in acquiring the information, at least information about the real volumes that are designated by setting information being inputted is acquired.

4. The method according to claim 1,
wherein each of the physical devices comprises a hard disk, a magnetic disc, an optical disc, a magneto-optical disc, and a magnetic tape.

5. A computer readable recording medium for storing a program that executes the method of claim 1.

6. A storage network system comprising:
at least one lower storage apparatus provided with one or more physical devices, each of which has one or more real volumes;
one or more computers, each being capable of using data in said volumes, for providing data access to the corresponding real volumes;
at least one upper storage apparatus for conducting mediation of the data access; and
an administrative server for setting the mediation, the administrative server comprising functions of:
acquiring information on the real volumes, and port information on physical devices in which the real volumes reside;
creating one or more virtual volumes being linked to the real volumes, based on the information on the real volumes;
forming one or more virtual volume groups by combining the virtual volumes, based on the port information, in such a way that the virtual volumes and the virtual volume groups in which the virtual volumes reside have a virtual-volume-to-virtual-volume-group configuration which is identical to a real-volume-to-physical-device configuration of the real volumes and the physical devices in which the real volumes reside; and
establishing the created virtual volume groups in the upper storage apparatus.

7. The network system according to claim 6,
wherein the administrative server comprises a function of outputting the information on the real volumes and the port information.

8. The network system according to claim 6,
wherein the administrative server comprises a function of acquiring at least information about the real volumes that are designated by setting information being inputted.

9. The network system according to claim 6,
wherein each of the physical devices comprises a hard disk, a magnetic disc, an optical disc, a magneto-optical disc, and a magnetic tape.

* * * * *